(12) United States Patent
Lakrout et al.

(10) Patent No.: US 10,442,941 B2
(45) Date of Patent: Oct. 15, 2019

(54) CURABLE COMPOSITIONS

(71) Applicant: BLUE CUBE IP LLC, Midland, MI (US)

(72) Inventors: Hamed Lakrout, Midland, MI (US); Katherine Clement, Midland, MI (US); Maurice J. Marks, Midland, MI (US)

(73) Assignee: Blue Cube IP LLC, St. Louis, MO (US)

( * ) Notice: Subject to any disclaimer, the term of this patent is extended or adjusted under 35 U.S.C. 154(b) by 20 days.

(21) Appl. No.: 15/558,796

(22) PCT Filed: Mar. 17, 2016

(86) PCT No.: PCT/US2016/022759
§ 371 (c)(1),
(2) Date: Sep. 15, 2017

(87) PCT Pub. No.: WO2016/160346
PCT Pub. Date: Oct. 6, 2016

(65) Prior Publication Data
US 2018/0072900 A1    Mar. 15, 2018

Related U.S. Application Data

(60) Provisional application No. 62/135,748, filed on Mar. 20, 2015.

(51) Int. Cl.
*C09D 11/101*    (2014.01)
*C09D 11/30*    (2014.01)
*C09D 11/322*    (2014.01)
*C09D 11/38*    (2014.01)

(52) U.S. Cl.
CPC ............ *C09D 11/101* (2013.01); *C09D 11/30* (2013.01); *C09D 11/322* (2013.01); *C09D 11/38* (2013.01)

(58) Field of Classification Search
CPC ....... C09D 11/30; C09D 11/322; C09D 11/38; C09D 11/101
See application file for complete search history.

(56) References Cited

U.S. PATENT DOCUMENTS 7,309,122 B2 * 12/2007 Nakajima ............ C09D 11/101
347/100
9,695,272 B2 * 7/2017 Carter ................... C08G 59/22

* cited by examiner

*Primary Examiner* — Sanza L. McClendon
(74) *Attorney, Agent, or Firm* — Husch Blackwell LLP

(57) ABSTRACT

A heat stable radiation curable epoxy resin composition for preparing an ink composition including: (a) at least one divinylarene dioxide compound; (b) at least one photoinitiator compound; (c) at least one pigment; and (d) at least one optional additive wherein the at least one photoinitiator compound is a triarylsulfonium salt; wherein the at least one pigment is (i) a cyan pigment, or (ii) a magenta pigment; a process for preparing the above heat stable radiation curable epoxy resin composition; and a cured inkjet ink product prepared by curing the above heat stable radiation curable epoxy resin composition.

18 Claims, No Drawings

CURABLE COMPOSITIONS

FIELD OF THE INVENTION

The present disclosure relates to a heat stable, radiation curable epoxy resin composition useful, for example, in photosensitive inkjet ink applications.

BACKGROUND OF THE INVENTION

Radiation curable compositions are known to be useful, for example, in inkjet ink applications. In general, ultraviolet light (UV) inkjet inks are acrylate-based formulations with high viscosity (e.g., greater than [>] 50 millipascal-second [mP-s] at 25° C.). These inkjet inks need special printheads with heating elements to heat the ink formulation and simultaneously lower the viscosity of the ink formulation during jetting. Epoxy-based UV inkjet inks are also known in the art. At high temperature (e.g., >40° C.), acrylate-based and epoxy-based inks can gel; and gelling can clog printhead channels and thus render the printheads inoperable. Therefore, there is a need in the ink industry for a heat stable ink. Heat stability (e.g., exhibiting little to no change in viscosity) of an ink is a requirement especially for an ink that exhibits a long shelf life (e.g., no change in properties for 6-12 months).

Curing of acrylate inks is known to be inhibited by the presence of oxygen in air. In order to overcome oxygen inhibition of the free radical reaction, a higher level (e.g., 5 weight percent [wt %] as opposed to 0.5 wt %) of photoinitiator in an ink formulation is required. Epoxy inks are not inhibited by the presence of oxygen in air, and shrinks less than acrylate inks that lead to improved adhesion. Epoxy inks also have the desirable property of "dark cure", whereby the system continues to react even after the light has ceased. Therefore, an unmet need in the ink industry is a UV ink formulation that is not inhibited by oxygen during curing/polymerization.

In the ink industry, the development of higher resolution inkjet printheads requires inks having a low viscosity and high thermal stability. Solvents are not preferred in ink jet formulations since the solvents need to be evaporated and release volatile organic compounds into the atmosphere. At present, an ink having a low viscosity is obtained by increasing the temperature of the ink and the printhead. This temperature increase can adversely affect the stability of the ink and the operation of the printer. The use of inks having low viscosity at ambient temperature eliminates the need for the use of heated printheads, improves cost effectiveness, and the environmental sustainability of the printing operation. The prior art fails to describe using a divinylarene dioxide such as divinylbenzene dioxide (DVBDO) in an inkjet ink curable composition having a high heat stability of, for example, above about 40° C. Therefore, an additional need in the ink industry is for a heat stable pigment UV inkjet ink having an initial viscosity of less than (<) 50 mPa-s. Preferably the inks comprise pigments such as cyan or magenta.

SUMMARY OF THE INVENTION

Disclosed herein are heat stable, radiation curable epoxy resin compositions, and methods to prepare and cure these compositions on an article. These compositions are useful as inks.

In one aspect, the heat stable, radiation curable epoxy resin compositions comprise: (a) at least one divinylarene dioxide compound; (b) at least one photoinitiator compound, and (c) at least one pigment; wherein the at least one photoinitiator compound is a triarylsulfonium salt having the following structure:

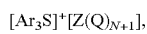

wherein $[Ar_3S]^+$ is a triarylsulfonium cation; $[Z(Q)_{N+1}]$ is a non-oxidizing, weakly coordinating anion; Z is a Group 3a, Group 4a, or Group 5a atom; Q is fluorine (F), an organo-fluorine radical, or mixtures thereof; N is the atomic number of element Z; and the number of Q groups bonded directly to Z is less than or equal to (N+1)/2 for group 5a. The at least one pigment is (i) a cyan pigment, or (ii) a magenta pigment wherein the viscosity, prior to ageing, of the heat stable curable epoxy resin composition is less than about 50 mPa-s at 25° C. In the case of a cyan ink, the short term change in viscosity of the composition is less than about 80 percent and the long term change in viscosity is less than about 90 percent measured at 25° C. after ageing at 60° C. For the magenta ink, the short term change in viscosity of the composition is less than about 50 percent and the long term change in viscosity is less than about 50 percent measured at 25° C. after ageing at 60° C.

In another aspect, disclosed herein are cured products prepared by curing the heat stable, radiation energy curable epoxy resin composition.

In a further aspect, disclosed herein are processes for preparing a heat stable, energy curable epoxy resin compositions. The processes comprise admixing (a) at least one divinylarene dioxide compound; (b) at least one photoinitiator compound, (c) at least one pigment, and other (d) at least optional additives.

Also disclosed are processes curing a heat stable curable epoxy resin composition. The processes comprise applying the epoxy resin composition on an article and then exposing the epoxy resin composition to a curing energy source forming a cured product.

Other features and iterations of the invention are described in more detail below.

DETAILED DESCRIPTION OF THE INVENTION

As previously mentioned, disclosed herein are heat stable radiation curable epoxy resin compositions comprising (a) at least one divinylarene dioxide, (b) at least one photoinitiator compound, (c) at least one pigment, and (d) at least optional additives wherein the at least one photoinitiator compound is a triarylsulfonium salt. These epoxy resin compositions provide many beneficial attributes such as low viscosity (<50 mPa-s at 25° C.) prior to ageing and increased thermal stability. After the epoxy resin compositions are applied and cured, the resulting coating provide improved traits such as adhesion to the substrate, water resistance, increased corrosion resistance, smear resistance, and vibrant color.

(I) Heat Stable, Energy Curable Epoxy Resin Compositions

In one aspect the epoxy resin compositions are heat stable. In general, the heat stable radiation curable epoxy resin composition is a curable composition.

(a) Divinylbenzene Dioxide Compound

The divinylarene dioxide compound, component (a), useful in the present invention of the curable epoxy resin composition comprises at least one divinylarene dioxide compound. The divinylarene dioxide may include, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, tetrahydronaphthalene, and the like. Homologously bonded (substituted) benzenes may consist of biphenyl, diphenylether, and the like. Non limiting examples of divinylarene dioxide may include one or more substituted divinylbenzene dioxide, divinylnaphthalene dioxide, divinylbiphenyl dioxide, divinyldiphenylether dioxide, and mixtures thereof. In one preferred embodiment, the divinylarene dioxide compound may be a divinylbenzene dioxide (DVBDO). In another embodiment, the curable formulation may include two or more conventional epoxy resin compounds wherein at least one of the epoxy resin compounds is a divinylarene dioxide compound. For example, the divinylarene dioxide useful in the curable epoxy resin composition of the present invention may include any of the divinylarene dioxides described in U.S. Pat. No. 8,497,387.

Examples of the divinylarene dioxides that may be used for preparing the formulations disclosed herein include Structures I-IV:

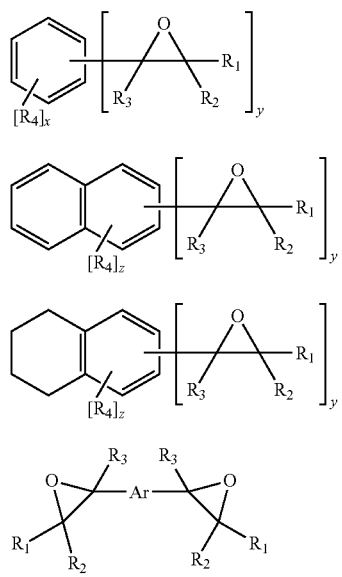

Structure I

Structure II

Structure III

Structure IV

In the above Structures, each $R_1$, $R_2$, $R_3$ and $R_4$ may independently be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, $R_4$ may be a reactive group(s) including epoxide, isocyanate, or any reactive group and Z can be an integer from 0 to 6 depending on the substitution pattern.

In one embodiment, the divinylarene dioxide useful in the present invention may be produced, for example, by the process described in U.S. Pat. No. 8,497,387, by Marks et al., incorporated herein by reference. In another embodiment, the divinylarene dioxides useful in the present invention are disclosed in, for example, U.S. Pat. No. 2,924,580, incorporated herein by reference.

In one preferred embodiment of the present invention, the divinylarene dioxide comprises DVBDO, which has a relatively low liquid viscosity and a higher rigidity and crosslink density than conventional epoxy resins.

DVBDO may be illustrated by Structure V:

Structure V

The chemical formula of the above DVBDO compound may be as follows: $C_{10}H_{10}O_2$; the molecular weight of the DVBDO is 162.2; and the elemental analysis of the DVBDO is: C, 74.06; H, 6.21; and O, 19.73 with an epoxide equivalent weight of 81 g/mol.

Structure VI below illustrates the meta isomer of DVBDO which may be used in the disclosed resins:

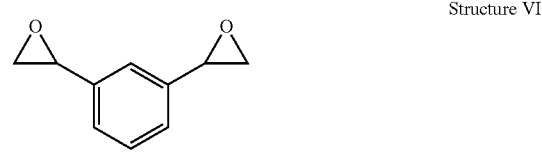 [SMILES: c1cc(C2CO2)cc(C2CO2)c1]

Structure VI

Structure VII below illustrates the para isomer of DVBDO, which may be used in the disclosed resins:

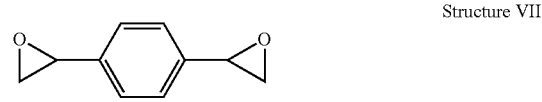 [SMILES: c1cc(C2CO2)ccc1C1CO1]

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment, the divinylarene dioxide may contain quantities (such as for example less than 20 wt %) of substituted arenes and/or arene oxides. The amount and structure of the substituted arenes and/or arene oxides mixed with a divinylarene dioxide composition depends on the process used in the preparation of the divinylarene precursor which is used to prepare the divinylarene dioxide. For example, the divinylarene precursor such as divinylbenzene (DVB) may be prepared by the dehydrogenation of diethylbenzene (DEB), and the resultant product composition may contain quantities of ethylvinylbenzene (EVB) and DEB. During the dehydrogenation reaction of DEB, wherein an oxidant such as hydrogen peroxide is utilized, the EVB present in the reaction mixture may react with hydrogen peroxide to produce ethylvinylbenzene oxide while DEB remains unchanged. The presence of ethylvinylbenzene oxide and DEB in the divinylarene dioxide can increase the epoxide equivalent weight of the divinylarene dioxide to a value greater than that of a pure divinylarene dioxide compound.

In one embodiment, the divinylarene dioxide, (for example DVBDO) may comprise a low viscosity liquid epoxy resin. The viscosity of the divinylarene dioxide used may range from 0.001 Pa-s to about 0.1 Pa-s. In various embodiments, the viscosity of the divinylarene dioxide may range from 0.001 Pa-s to about 0.1 Pa-s, from 0.005 Pa-s to about 0.05 Pa-s, and from 0.01 Pa-s to about 0.025 Pa-s at 25° C.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

Generally, the amount of the at least one divinylarene dioxide compound used in the curable composition may range from 5 wt % to about 90 wt % of the total composition. In various embodiments, the amount of the at least one divinylarene dioxide may range from 5 wt % to about 90 wt %, from 6 wt % to about 50 wt %, from 7 wt % to about 30 wt %, or from 8 wt % to about 20 wt % based on the total weight of the curable composition. If amounts of the at least one divinylarene dioxide is less than 5 wt %, depending on the other components, the composition may not attain a level of crosslinking sufficient to be dry.

(b) Photoinitiator Compound

The at least one photoinitiator compound, component (b) useful in preparing the curable composition of the present invention comprises photoinitiator compounds that do not destabilize the dispersion of the pigment in the curable composition. In addition, the at least one photoinitiator affects the cure to dryness in a short amount of time. Generally, the time to cure to dryness may be less than 600 seconds, less than 300 seconds, and preferably less than about 120 seconds when exposed to less than about 400 mJ, preferably less than about 300 mJ, and most preferably less than about 200 mJ of light.

Nonionic cationic photoinitiators such as nitrobenzyl esters, sulfonyl ketones, phenacyl sulfones, triazines, and phenyl disulfones make thermally stable compositions, but upon UV exposure generate sulfonic acids or fluorosulfonic acids, which are not strong enough to cure these compositions to dryness quickly, instead requiring hours to cure. Upon UV irradiation, iodonium salt photoinitiators with perfluorophosphate, antimonate or tetrakis(perfluorophenyl) borate counterions generate much stronger perfluorophosphoric, perfluoroantimonic and tetrakis(perfluorophenyl)boric acids which may rapidly cure. Unfortunately, the iodonium salts are not stable to heat and are therefore not suitable to produce stable ink formulations. Organic sulfonium salt photoinitiators with perfluorophosphate, perfluoroantimonate, or other anions capable of producing superacids with pKa's of less than about −12, are both thermally stable as well as produce the superacids necessary for rapid cure. However, sulfonium salts are capable of interacting with dyes or pigments thus causing instability and an increase in viscosity. This instability is worse for sulfonium cations having more than one sulfonium center and particularly severe for those cations with a bridged sulfonium center such as that found in the sulfonium cations based on thianthreniums or thioxanthenes. Non-limiting examples of the low odor sulfonium photoinitiators are 10-biphenyl-4-yl-2-isopropyl-9-oxo-9H-thioxanthen-10-ium hexafluorphosphate (e.g., Omnicat 550 available from IGM Resins) and 9-4-hydroxyethoxy)thianthrenium hexafluorophosphate (e.g., Esacure 1187 available from Lamberti).

The instability results when pigments or dyes having basic nitrogen groups are combined with sulfonium salts in which the sulfonium center is accessible. This instability is eliminated by combining active nitrogen pigments only with sulfonium photoinitiators in which the sulfonium center is shielded by a sufficiently large non-nucleophilic anion.

The at least one photoinitiator compound useful in preparing the curable composition of the present invention includes, for example, at least one triarylsulfonium salt having the following structure:

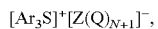

wherein $[Ar_3S]^+$ is a triarylsulfonium cation; $[Z(Q)N+1]$ is a non-oxidizing, weakly coordinating anion; Z is a Group 3a, Group 4a, or Group 5a atom; Q is fluorine (F), an organofluorine radical, or mixtures thereof; N is the valence of element Z; and for Group 5a atoms, the number of Q groups bonded directly to Z is less than or equal to $(N+1)/2$.

The triarylsulfonium cation may comprise any triarylsulfonium cation wherein the three aryl groups are the same or different and may bear alkyl, aryl, substituted aryl groups, and mixtures thereof. The anion $A^-$ may be non-oxidizing and weakly coordinating. Non-limiting examples of the anion $A^-$ may be fluorinated tetra-aryl borates, such as tetrakis(pentafluorophenyl)borate, fluoroalkyl fluorophosphates, such as tris(pentafluoroethyl)trifluorophosphate, tris(fluoroalkylsulfonyl)carbanion, such as tris(trifluoromethylsulfonyl)methide, bis(fluoroalkylsulfonyl)nitrides; and mixtures thereof.

In various embodiments, the photoinitiator may be a commercially available photoinitiator. The photoinitiator compound may be a solid photoinitiator or a liquid photoinitiator, or a combination thereof. Non-limiting examples of commercially available photoinitiators may be triarylsulfonium tris(perfluoroethyl)trifluorophosphate such as 210S available from San Apro; GSID26-1 and Irgacure 290 available from BASF; and mixtures thereof. These photoinitiators may provide stability of magenta and cyan pigment compounds. In addition, these solid photoinitiators may be dissolved in a reactive diluent. Table I illustrates some examples of photoinitiators,

TABLE I

Examples of Photoinitiators

| Compound | Features | Trade Name | Vendor |
|---|---|---|---|
| Triarylsulfonium tris(perfluoroethyl) trifluorophosphate | Salt | 210S | San Apro |
| Triarylsulfonium tetrakis(perfluorophenyl)borate | Salt | Irgacure 290 | BASF |
| Triarylsulfonium tris[(trifluoromethyl)sulfonyl]methanide | Salt | GSID26-1 | BASF |

In a preferred embodiments, the at least one cationic photoinitiator may be Ingracure 290 or 210S.

Generally, the amount of the at least one cationic photoinitiator compound used in the epoxy resin composition may be from 1 wt % to about 10 wt %. In various embodiments, the amount of the at least one cationic inhibitor may be from 1 wt % to about 10 wt %, from 1.25 wt % to about 8 wt %, from 1.75 wt % to about 6 wt %, or from 2 wt % to about 5 wt % based on the total weight of the curable composition. At low concentrations, the cure speed may be adversely affected. At very low levels, the generated acid can be completely neutralized by basic functional groups present on the colorant, especially magenta and cyan pigments consisting of quinacridones and phthalocyanines.

(c) Pigment

The at least one pigment compound, component (c) comprises a pigment dispersion, wherein the dispersion may consist of a pigment compound, and optionally a synergist and/or a dispersant in a reactive carrier. The pigment may include for example a cyan pigment, a magenta pigment, or mixtures thereof. The cyan and magenta pigment compounds useful in the present invention include those described in the Color Index (C.I.), the industry standard for pigment compounds.

In one embodiment, the at least one pigment may be a cyan pigment. The at least one cyan pigment may include, for example, any one or more of the following pigments, represented by their Color Index (C.I.) designation, Non-limiting examples of cyan pigments may include Pigment Blue 15, 15:1, 15:3, 15:4, 15:6, 22, 60, and 64; Disperse Blue 56, 73, 128, 154, 165, 183, 201, 214, 224, 257, 266, 267, 287, and 368; and mixtures thereof. Table II shows some examples of cyan pigments.

TABLE II

Examples of Cyan Pigments

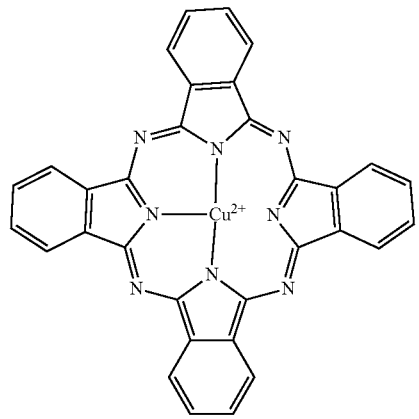
PB15

TABLE II-continued

Examples of Cyan Pigments

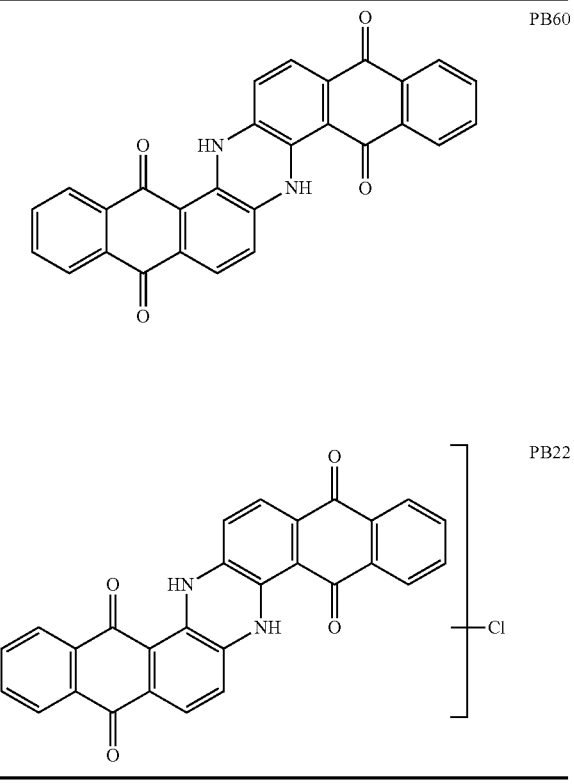
PB60

PB22

In another embodiment, the at least one pigment may be a magenta pigment. Non-limiting examples of magenta pigments may be, any one or more of the following pigments, represented by their Color Index (C.I.) designation, such as Pigment Violet 19, 23, 29, 30, 37, 40, and 50; Pigment Red 9, 11, 12, 31, 48, 48:2, 49, 52, 53, 57, 88, 97, 122, 123, 149, 168, 177, 180, 192, 202, 206, 215, 216, 217, 220, 223, 224, 226, 227, 228, 238, and 240; and Disperse Red 86, 88, 92, 126, 135, 145, 152, 159, 177, 181, 206, 283, and 348. Table III shows some examples of magenta pigments.

TABLE III

Examples of Magenta Pigments

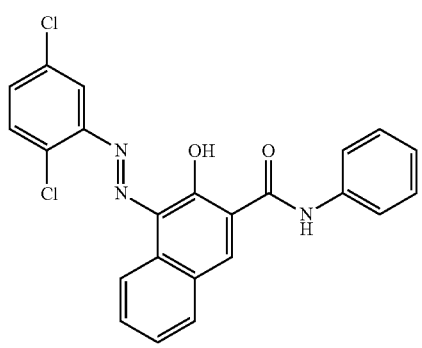 [SMILES: O=C(Nc1ccccc1)c1cc2ccccc2c(/N=N/c2cc(Cl)ccc2Cl)c1O]
PR2

TABLE III-continued
Examples of Magenta Pigments
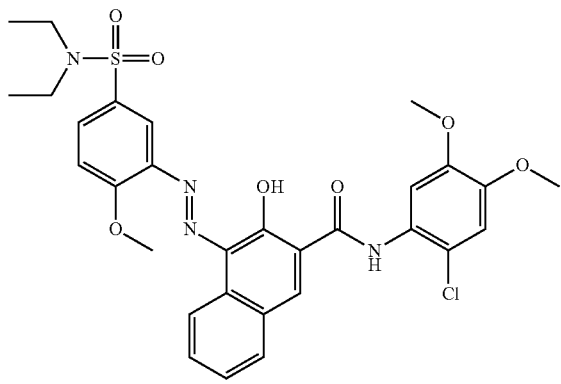 [SMILES: CCN(CC)S(=O)(=O)c1ccc(OC)c(/N=N/c2c(O)c(C(=O)Nc3cc(OC)c(OC)cc3Cl)cc3ccccc23)c1]
PR5
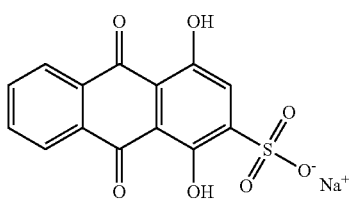 [SMILES: O=C1c2ccccc2C(=O)c2c(O)c(S(=O)(=O)[O-])cc(O)c21 ; [Na+]]
PV5
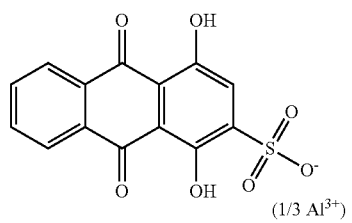
PV5
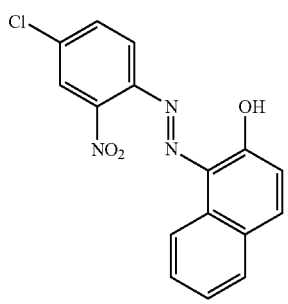 [SMILES: O=[N+]([O-])c1cc(Cl)ccc1/N=N/c1c(O)ccc2ccccc12]
PR6
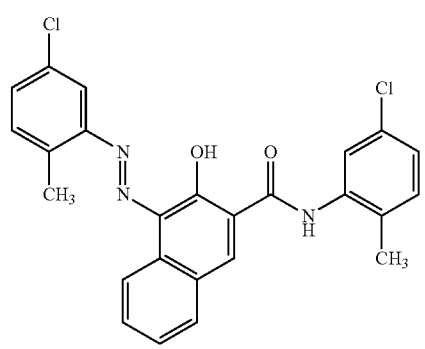 [SMILES: Cc1ccc(Cl)cc1/N=N/c1c(O)c(C(=O)Nc2cc(Cl)ccc2C)cc2ccccc12]
PR11

TABLE III-continued
Examples of Magenta Pigments
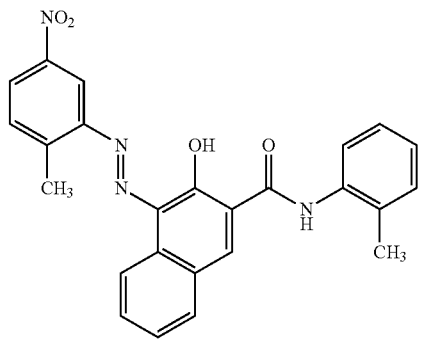 [SMILES: Cc1ccc([N+](=O)[O-])cc1/N=N/c1c(O)c(C(=O)Nc2ccccc2C)cc2ccccc12]
PR12
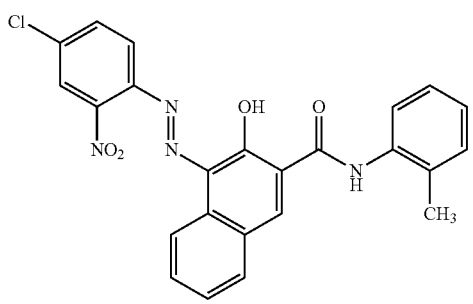 [SMILES: Cc1ccccc1NC(=O)c1cc2ccccc2c(/N=N/c2ccc(Cl)cc2[N+](=O)[O-])c1O]
PR14
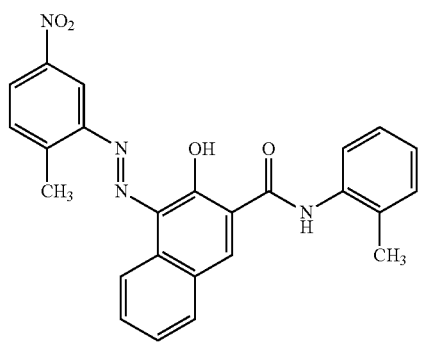 [SMILES: Cc1ccc([N+](=O)[O-])cc1/N=N/c1c(O)c(C(=O)Nc2ccccc2C)cc2ccccc12]
PR17
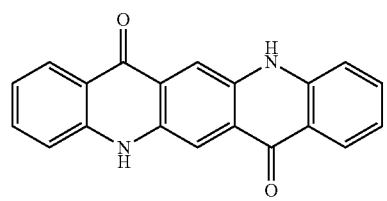 [SMILES: O=c1c2ccccc2[nH]c2cc3c(=O)c4ccccc4[nH]c3cc12]
PV19
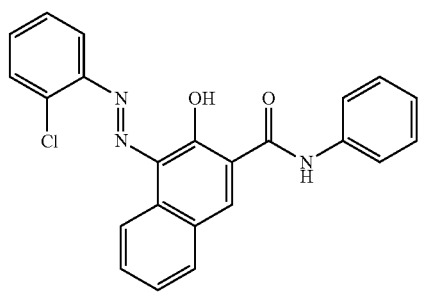 [SMILES: O=C(Nc1ccccc1)c1cc2ccccc2c(/N=N/c2ccccc2Cl)c1O]
PR21

TABLE III-continued
Examples of Magenta Pigments
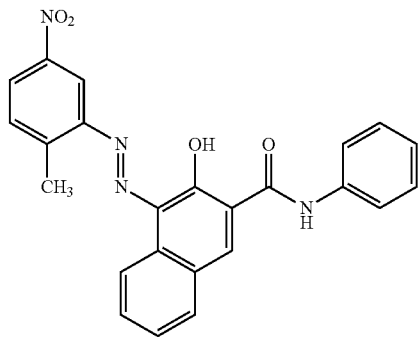 [SMILES: Cc1ccc([N+](=O)[O-])cc1/N=N/c1c(O)c(C(=O)Nc2ccccc2)cc2ccccc12]
PR22
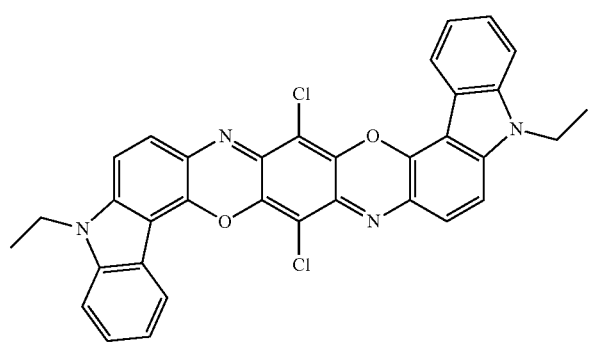 [SMILES: CCn1c2ccccc2c2c3c(ccc21)N=c1c(Cl)c2c(c(Cl)c1O3)=Nc1ccc3c(c1O2)c1ccccc1n3CC]
PV23
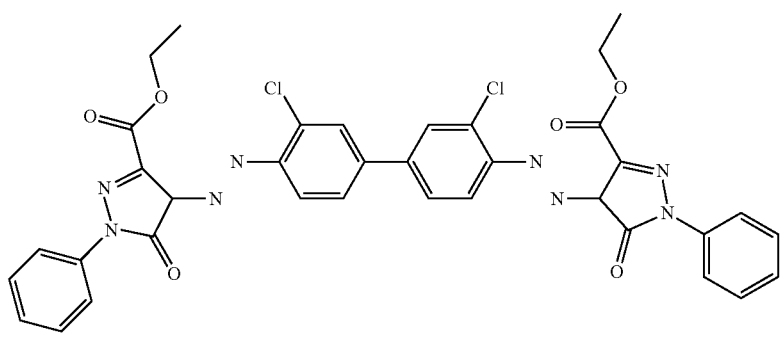
PR38
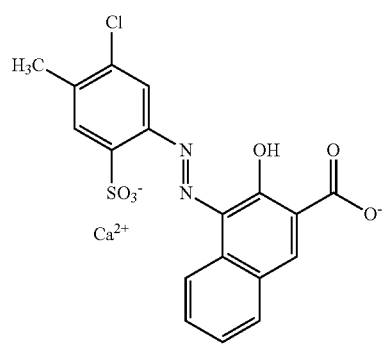
PR48:2

TABLE III-continued
Examples of Magenta Pigments
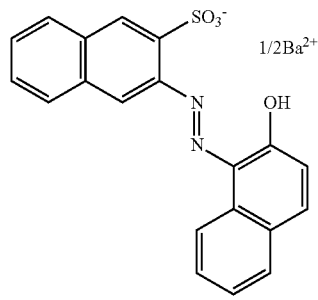
PR49:1
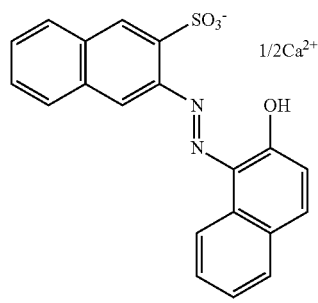
PR49:2
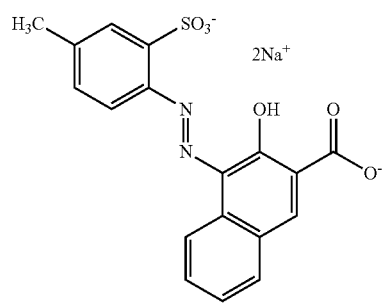
PR57
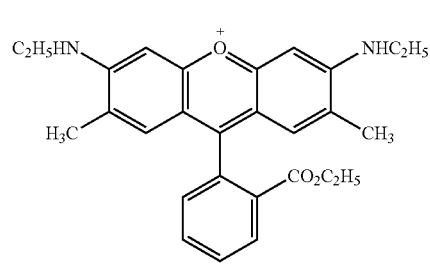
PR81
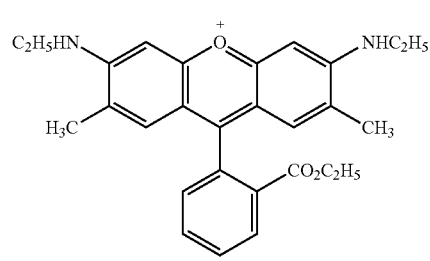
PR81:1

TABLE III-continued
Examples of Magenta Pigments
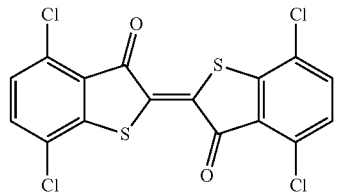 [SMILES: O=C1/C(=C2\Sc3c(Cl)ccc(Cl)c3C2=O)Sc2c(Cl)ccc(Cl)c21]
PR88
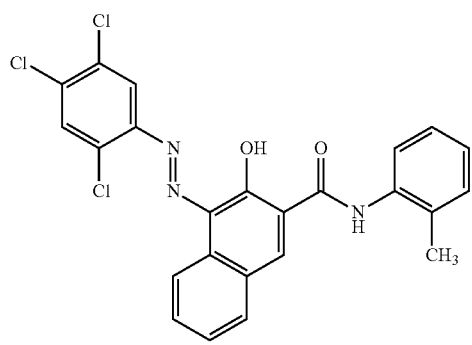 [SMILES: Cc1ccccc1NC(=O)c1cc2ccccc2c(/N=N/c2cc(Cl)c(Cl)cc2Cl)c1O]
PR112
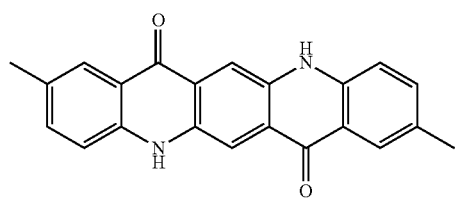
PR122
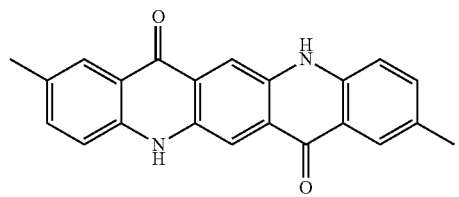
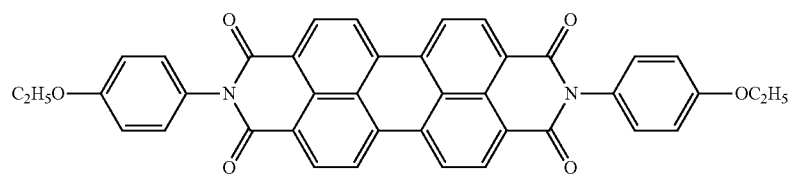
PR123
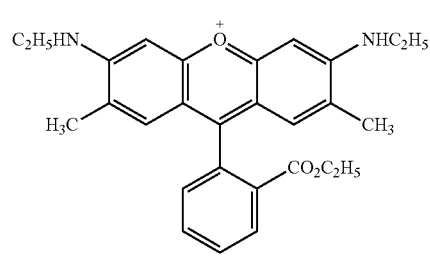
PR169

TABLE III-continued
Examples of Magenta Pigments
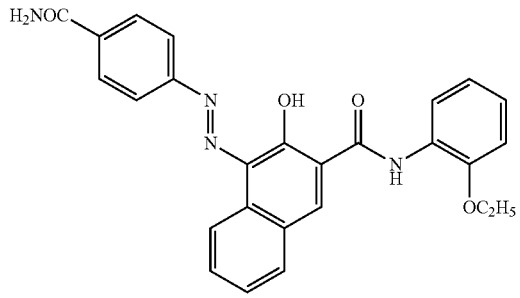 [SMILES: CCOc1ccccc1NC(=O)c1cc2ccccc2c(/N=N/c2ccc(C(N)=O)cc2)c1O]
PR170
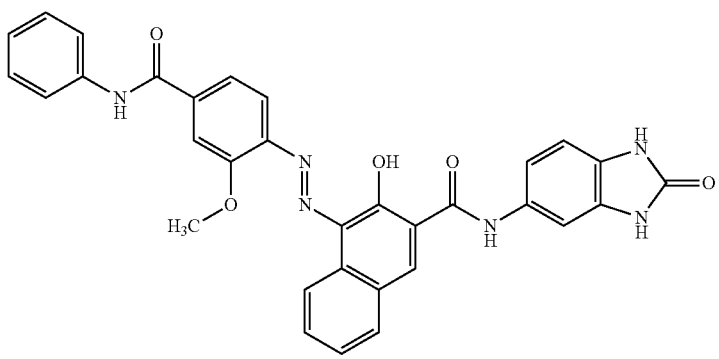 [SMILES: COc1cc(C(=O)Nc2ccccc2)ccc1/N=N/c1c(O)c(C(=O)Nc2ccc3[nH]c(=O)[nH]c3c2)cc2ccccc12]
PR176
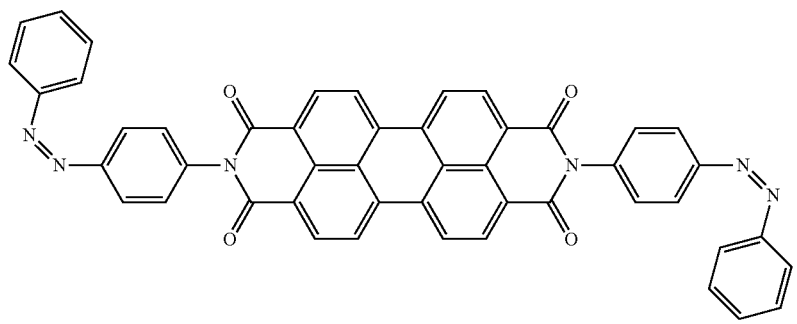 [SMILES: O=C1c2ccc3c4ccc5c6c(ccc(c7ccc(c2c37)C(=O)N1c1ccc(/N=N\c2ccccc2)cc1)c64)C(=O)N(c1ccc(/N=N\c2ccccc2)cc1)C5=O]
PR178
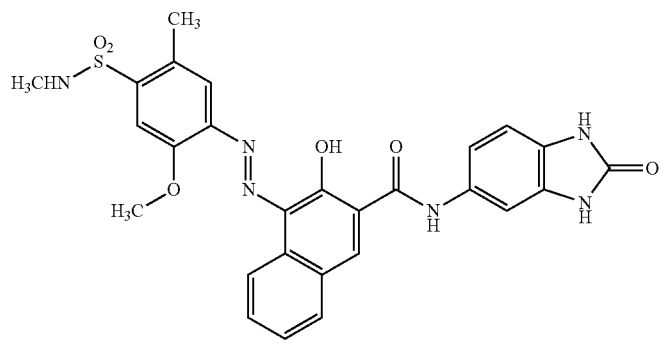
PR185
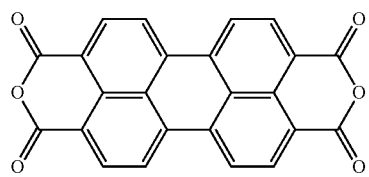 [SMILES: O=C1OC(=O)c2ccc3c4ccc5c6c(ccc(c7ccc1c2c73)c64)C(=O)OC5=O]
PR224

TABLE III-continued

Examples of Magenta Pigments

PR254

PR257

One important property of the pigments is light fastness. Non-limiting examples of pigments that have the preferable light fastness quality may include quinacridone organic pigments, phthalocyanine organic pigments, benzimidazolone organic pigments, isoindolinone organic pigments, condensed azo organic pigments, quinophthalone organic pigments, isoindolin organic pigments; and mixtures thereof.

Generally, the organic pigments comprise pigment particles having an average particle diameter of from about 10 nanometers (nm) to about 200 nm. The particle size of the pigment may be determined utilizing a laser scattering method. Pigments having an average particle diameter less than about 10 nm lowers the light fastness due to the excessively small particle diameter. Conversely, pigments having an average diameter exceeding 200 nm and in some cases exceeding 150 nm lowers dispersion stability in the dispersion solution, whereby the pigments tend to precipitate.

In preferred embodiments, the pigment compound comprises a basic nitrogen functionality, particularly amino N—H groups. Examples of these pigments may be (i) a cyan pigment based on a phthalocyanine compound, or (ii) a magenta or cyan pigment based on a cyclic organic compound bearing amino N—H groups. Non-limiting examples of preferred pigments may be PB15:4 (Phthalocyanine Blue NCF (29H,31H-phthalocyaninato($2-$)-N29,N30,N31,N32) copper) Phthalo Blue GS, Pigment Blue 60, Disperse Blue 60, Disperse Blue 56 (1,5-Diamino-2-chloro-4,8-dihydroxy-9,10-anthracenedione), PR122, PV19, Disperse Red 60, PR11, PR12, PR31, PR48:2, PR49:1, PR49:2, PR57, PR81, PR81:1, PR257 (117989-29-4; 70833-37-3 C.I. 562700), PR176 (12225-06-8 C.I. 12515), PR185 (51920-12-8 C.I. 12516), PR177, PR88 (Paliogen Red Violet K 4985), PR123 red (Indofast Brilliant Scarlet R-6335), PR224 (128-69-8 C.I. 71127), PR176 (12225-06-8 C.I. 12515), PR2 (Naphthol Red G), PR21 (Pigment Red 21), PR22 (Naphthol red bright), PR38 (Pyrazolone Red), PR48:2 (Calcium Red), PR112 (Naphthol red AS), PR122 (Quinacridone Red), PR123 (Perylene), PR170 (Naphthol red), PR178 (Perylene Red), PR254 (Pyrrole red), PV19 (Quinacridone Violet), PV23 (Permanent violet); and mixtures thereof.

Generally, the amount of the at least one pigment compound used in the curable composition may range from 0.5 wt % to about 15 wt % based on the total weight of the composition. In various embodiments, the amount of the at least one pigment may range from 0.5 wt % to about 15 wt %, from 0.6 wt % to about 12 wt %, from 0.75 wt % to about 10 wt %, from 1.0 wt % to about 7.5 wt %, or from 1.5 wt % to about 5 wt %. At concentrations above 15 wt % of the pigment, the viscosity of the composition increases rapidly and the level of shading and light absorption in the coating can make achieving complete cure difficult.

(d) Optional Additives

In various embodiments, the curable epoxy resin composition may further comprise at least one additive chosen from another epoxy compound other than the divinylarene dioxide, an oxetane, a filler, a reactive diluent, a flexibilizing agent, a processing agent, and a toughening agent.

In some embodiments, the curable epoxy resin composition may comprise at least one disperant compound which may be used to prepare a pigment dispersion. Non limiting examples of these dispersant may be Solsperse 20000, Solsperse 22000, Solsperse 27000, Solsperse 32000, Solsperse 39000, Solsperse 41000, Solsperse 5000, Bykjet 9150, Bykjet 9151, and mixtures thereof.

In other embodiments, the curable epoxy resin composition may optionally include at least one other epoxy compound other than the divinylarene dioxide to form the epoxy matrix in a final curable formulation. For example, the epoxy compound may include any conventional epoxy compound. The epoxy compound may be, for example, a single epoxy compound used alone; or a combination of two or more epoxy compounds known in the art such as any of the epoxy compounds described in Lee, H. and Neville, K., Handbook of Epoxy Resins, McGraw-Hill Book Company, New York, 1967, Chapter 2, pages 2-1 to 2-27, incorporated herein by reference. In a preferred embodiment, the second epoxy compound may include cycloaliphatic or aliphatic epoxy compounds such as limonene dioxide, epoxidized linseed oil (ELO), cyclohexene oxide, 3,4-epoxycyclohexylmethyl 3,4-epoxycyclohexanecarboxylate (e.g., Synasia 06, ERL 4221, Cyracure 6105), bis((3,4-epoxycyclohexyl)methyl)adipate (Synasia 28), styrene oxide, or mixtures thereof.

Generally, the amount of the second epoxy compound may be from 0 wt % to about 60 wt % based on the total weight of the composition. In various embodiments, the amount of the second epoxy resin compound may range from 0 wt % to about 60 wt %, from 0.01 wt % to about 50 wt %, and from about 4 wt % to about 40 wt % based on the total weight of the curable composition.

In other embodiments, the curable epoxy resin composition may optionally include at least one cationically polymerizable monomer, as a reactive diluent (for example, for the purpose of decreasing crosslink density, reducing viscosity, and increasing flexibility). Non-limiting examples of cationically polymerizable monomers may be aliphatic monovinyl ethers, aromatic monovinyl ethers, polyfunctional vinyl ethers, styrenes, cationically polymerizable nitrogen-containing monomers, and mixtures thereof. Examples of the aliphatic monovinyl ethers may include methyl vinyl ether, ethyl vinyl ether, butyl vinyl ether, isobutyl vinyl ether, cyclohexyl vinyl ether, 2-chloroethyl vinyl ether, 2-hydroxyethyl vinyl ether, 4-hydroxybutyl vinyl ether, stearyl vinyl ether, 2-acetoxyethyl vinyl ether, diethylene glycol monovinyl ether, triethylene glycol monovinyl ether, 2-ethylhexyl vinyl ether, dodecyl vinyl ether, octadecyl vinyl ether, allyl vinyl ether, 2-methacryloyloxyethyl vinyl ether, 2-acryloyloxyethyl vinyl ether, and mixtures thereof. Examples of aromatic monovinyl ethers may include 2-phenoxyethyl vinyl ether, phenyl vinyl ether, p-methoxyvinyl ether, and mixtures thereof. Examples of the polyfunctional vinyl ether may include triethylene glycol divinyl ether, diethylene glycol divinyl ether, butanediol divinyl ether, 1,4-cyclohexanedimethanol divinyl ether, hydroquinone divinyl ether, dipropylene glycol divinyl ether, hexanediol divinyl ether, and mixtures thereof. Examples of the styrenes may include styrene, a-methylstyrene, p-methoxystyrene, p-tert-butoxystyrene, and mixtures thereof. Examples of the cationically polymerizable nitrogen-containing monomers may include N-vinylcarbazole, N-vinylpyrrolidone, and mixtures thereof.

Generally, the amount of the at least one vinyl ether compound used in the curable composition may be from 0 wt % to about 60 wt %. In various embodiments, the amount of the at least one vinyl ether compound used in the curable composition may range from 0 wt % to about 60 wt %, from 1 wt % to about 55 wt %, or from 5 wt % to about 50 wt % based on the total weight of the components in the curable composition.

In other embodiments, the reactive diluent may comprises an oxetane, a cyclic organic carbonate, a polyol, a lactone, or combinations thereof. Non-limiting examples of these diluents may be Toagosei oxetane 101, oxetane 212, oxetane 221, a cyclic carbonate such as propylene carbonate, a polyol, such as diethylene glycol, triethylene glycol, polycaprolactones such as CAPA, polytetrahydrofurans such as Terathane 250, Terathane 650, Terathane 1000, and combinations thereof.

Generally, the amount of diluent when used in the curable composition may be for example, from 0 wt % to about 50 wt % in one embodiment, from about 0.01 wt % to about 45 wt % in another embodiment; from about 0.1 wt % to about 40 wt % in still another embodiment; and from about 1 wt % to about 35 wt % in yet another embodiment.

In general, a photosensitizer, as a modifier agent, may be added to the formulation for the purpose of altering UV wavelengths which can be used for cure. Non-limiting examples of photosensitizer may include 9,10-diethoxyanthracene, 9,10-dipropoxyanthracene, 9,10-dibutoxyanthracene, 9-hydroxymethylanthracene; and mixtures thereof.

Generally, the amount of the photosensitizer used in the curable composition can and will vary depending on the end use of the curable composition and the cure speed desired. For example, as one illustrative embodiment, when cure is desired to occur using UV LED's at a wavelength such as 390 nm at which the sulfonium photoinitiator is not reactive, a photosensitizer such as 9,10-diethoxyanthracene can be added. The amount of photosensitizer in the composition may be from 0 wt % to about 4 wt %. In various embodiments, the amount of photosensitizer in the composition may be from 0 wt % to about 4 wt %, from 0.01 wt % to about 3 wt %; and from 0.5 wt % to about 2 wt % based on the total weight of the components in the curable composition.

In other embodiments, a modifier may be added to the formulation for the purpose of altering the surface tension or haptic properties. Non-limiting examples of the surface tension/haptic property modifiers may be BYK 378, BYK 307, Dow Corning 204SL, and mixtures thereof.

Generally, the amount of the modifier used in the curable composition can and will depending on the end use of the curable composition. When a haptic modification may be needed, the amount of modifier in the composition may be from 0 wt % to about 4 wt %. In various embodiments, the amount of modifier in the composition may be from 0 wt % to about 4 wt %, from 0.01 wt % to about 2 wt % in and from 0.1 wt % to about 1 wt % based on the weight of the curable composition.

Other optional additives may be introduced to the curable composition. These optional additives may include compounds that are normally used in resin formulations known to those skilled in the art for preparing curable compositions and thermosets. Non-limiting examples of the optional components may comprise compounds that can be added to the composition to enhance application properties (e.g., surface tension modifiers or flow aids), reliability properties (e.g., adhesion promoters) the reaction rate, the selectivity of the reaction, and/or the catalyst lifetime. Other optional components that may be added to the curable composition of the present invention may include toughening agents, flow modifiers, adhesion promoters, stabilizers, flexibilizing agent, a processing aide, plasticizers, and mixtures thereof.

Generally, the amount of the optional components used in the curable composition of the present invention can and will vary depending on the end use of the curable composition. For example, when the curable composition is used to prepare an inkjet ink formulation, the amount of the optional components, when used, may be from 0 wt % to about 50 wt %. In various embodiments, the amount of the optional components may be from 0 wt % to about 50 wt %, from about 0.1 wt % to 40 wt %, from 1 wt % to about 30 wt % and from 2 wt % to about 20 wt % based on the weight of the curable composition.

(II) Properties of the Heat Stable Radiation Curable Epox Resin.

In general, the heat stable, epoxy resin curable composition, before curing, is a liquid. The curable composition exhibits a low viscosity (<50 mPa·s at 25° C.). The composition being of low viscosity facilitates the processing of the low viscosity formulation, particularly when the formulation is used in inkjet ink applications. In various embodiments, a low viscosity ink formulation of the present invention generally may exhibit a viscosity at 25° C. of less than or equal to about 50 mPa·s, less than about 40 mPa·s, less than about 30 mPa·s, less than about 20 mPa·s and less than about 10 mPa·s. In other embodiments, the low viscosity composition of the present invention may exhibit a viscosity of greater than about 2 mPa·s, greater than about 4 mPa·s, and greater than about 5 mPa·s. In still another embodiment, the viscosity of the curable composition may exhibit a viscosity of from 2 mPa·s to about 50 mPa·s, from 4 mPa·s to about 40 mPa·s, and from 5 mPa·s to about 30 mPa·s.

One of the important properties of the heat stable curable is the curable composition exhibits heat stability sufficient to provide the benefit of facilitating the processing of the heat stable formulation, particularly when the formulation is used in inkjet ink applications.

Generally, the short-term change in viscosity and the long-term change in viscosity (measured at 25° C.) of the curable composition containing the cyan pigment and the magenta pigment (after ageing at 60° C.) as described above, provides a heat stable ink formulation of the present invention that advantageously can be processed through inkjet process without degradation of the ink by heat.

The short term change (between about 24 hours and about 72 hours) in cyan's ink viscosity (measured at 25° C.) after ageing at 60° C. may be less than 80%. In various embodiments, the short term change in cyan's ink viscosity (measured at 25° C.) may be less 80%, less than 75%, and less than about 70%. The long term change (between about 24 hours and about at least 170 hours) in viscosity (measured 25° C.) of the cyan ink after ageing at 60° C. may be less than about 90%. In various embodiments, the long term change in the viscosity (measured 25° C.) may be less than 90%, less than 80%, and less than about 70%.

The short term change (between about 24 hours and about 72 hours) in magenta's ink viscosity (measured at 25° C.) after ageing at 60° C. may be less than 50%. In various embodiments, the short term change in magenta's ink viscosity (measured at 25° C.) may be less 50%, less than 30%, and less than about 10%. The long term change (between about 24 hours and about at least 105 hours) in viscosity (measured 25° C.) of the magenta ink after ageing at 60° C. for at least 105 hours may be less than about 50%. In various embodiments, the long term change in the viscosity (measured 25° C.) may be less than 50%, less than 30%, and less than about 10%.

The low viscosity, heat stable ink formulation advantageously can be processed through a wider range of inkjet print heads at higher temperatures. For example, low viscosity, heat stable ink formulation of the present invention can be processed through inkjet print head temperatures of from about 0° C. to about 60° C.

(III) Processes for Preparing a Heat Stable Radiation Curable Epoxy Resin.

The processes for preparing the heat stable UV curable epoxy resin composition includes admixing (a) at least one divinylarene dioxide compound, (b) at least one photoinitiator compound; (c) at least one pigment compound; and (d) other optional additives as needed. For example, the preparation of the curable epoxy resin composition may be achieved by blending, in known mixing equipment, the divinylarene dioxide compound, the photoinitiator compound, the pigment, and optionally any other desirable additives in any order. Any of the above-mentioned optional additives, for example a second epoxy resin or a vinyl ether, may be added to the composition during the mixing or prior to the mixing to form the composition.

All the compounds of the curable epoxy resin composition may be mixed and dispersed at a temperature enabling the preparation of an effective UV curable epoxy resin composition having the desired balance of properties for a particular application. In general, the temperature during the mixing of all components may range from 0° C. to about 50° C. In various embodiments, the temperature during the mixing of all the components from 0° C. to about 50° C., from 10° C. to about 40° C., or from 20° C. to about 30° C. In one embodiment, the temperature during the mixing of all the components may be about room temperature (~23° C.). Lower mixing temperatures may help to minimize side reactions and may maximize the pot life of the composition. The mixing may be typically performed under ambient pressure. The reaction may also be conducted under an inert atmosphere, for example, under nitrogen, argon, or helium.

The preparation of the curable epoxy resin composition, and/or any of the steps thereof, may be a batch or a continuous process. The mixing equipment used in the process may be any vessel and ancillary equipment well known to those skilled in the art.

(IV) Processes for Preparing a Cured, Heat Stable Epoxy Resin Composition

Another aspect of the present disclosure provides processes for preparing a cured epoxy resin coating. The processes comprise providing a curable, heat stable epoxy resin composition, which is detailed above, and exposing the curable epoxy resin composition to a curing energy source to form the cured epoxy resin coating. Generally, the curable heat stable epoxy resin composition is applied to at least a portion of a surface of an article to be coated, prior to subjecting it to an energy source for curing.

(a) Heat Stable Curable Epoxy Resin Composition

Suitable heat stable curable epoxy resin compositions are described above.

(b) Articles

Another aspect of the present disclosure encompasses an article comprising a cured or uncured low viscosity epoxy resin composition adhering to at least one portion of the substrate. The article, in broad terms, may be defined as a material wherein the heat stable curable epoxy resin composition is initially applied. The composition then adheres to at least a portion of at least one surface of the substrate. The curable epoxy resin composition may be cured at a exposing the composition to a curing energy source to form a thermoset or cured composition such that the coating bonds to the substrate. The article may be any material that can withstand the curing energy to form a cured coating.

In various embodiments, the article may be a metal. The article, as defined herein, may be a single metal or an alloy of various metals. Non-limiting examples of these metals include cast iron, aluminum, tin, brass, steel, copper, zinc aluminum alloy, nickel, or combinations thereof.

In other embodiments, the substrate may be a cellulose product. Non-limiting examples of cellulose products may be paper, paperboard, paper cardstock, cardboard, and wood.

In still another embodiment, the substrate may be a plastic. Non-limiting examples of plastics may be bakelite, polyester, polyethylene terephthalate, polyethylene, high density polyethylene, polyvinyl chloride, polyvinylidene chloride, polypropylene, polystyrene, polyamides (Nylon), acrylonitrile butadiene styrene, polycarbonates, polyurethanes, and combinations thereof.

In yet another embodiment, the article may be a fabric or a textile. Non-limiting examples of fabrics may be wool, canvas, cotton, Gore-Tex, hemp, Kevlar, knit, lace, lambswool, leather, linen, neoprene, Nomex, nylon, polyester, rayon, silk, suede, velour, velvet, vinyl coated polyester, and combinations thereof.

In various embodiments, the article may be in various configurations. Non-limiting configuration examples of the article may be a roll, a coil, a plate, a sheet, a tube, or a pipe. The configuration of the article may be of various dimensions, shapes, thicknesses, and weights.

In preferred embodiments, the article may be paper, a fabric, or a textile.

(c) Applying the Heat Stable, Curable Epoxy Resin Composition

The process further comprises applying the curable epoxy resin composition to a portion of at least one surface of an article. Suitable articles are detailed above. Application of the curable coating composition may be applied through various means. For example, the coating composition may be applied using a drawdown bar, a roller, a knife, a paint brush, a sprayer, dipping, an inkjet device, or other methods known to the skilled artisan. Also, more than one application of the coating composition may be applied forming a multi-layered coating. As detailed above, the curable coating composition may be applied to one or more surfaces of the article to be coated. One preferred application of these curable epoxy resin composition may be ink jet or an inkjet device. The composition may be loaded into an ink jet cartridge, and then applied to an article.

(d) Curing the Heat Stable, Curable Epoxy Resin Composition

The process further comprises curing the curable epoxy resin composition to a portion of at least one surface of an article. The heat stable curable compositions may be cured by exposing the composition to a curing energy source to form a cured composition or thermoset. These curable compositions may include various coatings and more specifically, inkjet ink coatings. By "curing energy", the composition may be cured by various energy means. For example, the various energy means may include thermal means, electron beam means, and UV means. In inkjet ink applications, for example, a UV curable inkjet ink formulation may be processed in accordance with the procedure described in Hudd, Alan, p. 5, Chemistry of Inkjet inks Edited by: Magdassi, Shlomo© 2010 World Scientific.

The curable composition may be cured using a UV lamp or source with multiple wavelengths such as with a metal halide light source or a unique narrow wavelength distribution provided by a light-emitting diode (LED) at a UV wavelength of generally from about 190 nm to about 450 nm. In various embodiments, the UV wavelength may be from 190 nm to about 450 nm, from 200 nm to about 425 nm, or from 210 nm to about 400 nm.

Generally, the curing energy the curable composition may be chosen between 20mJ/cm$^2$ to about 1000 mJ/cm$^2$. In various embodiments, the curing energy may be between 20mJ/cm$^2$ to about 1000 mJ/cm$^2$, between 30 mJ/cm$^2$ to about 800mJ/cm$^2$, between 40 mJ/cm$^2$ to about 500 mJ/cm$^2$, and between 50 mJ/cm$^2$ to about 250 mJ/cm$^2$.

The cure speed of a curable composition can and will vary depending on the level of photoinitiator used and the level of curing energy to which the curable composition is exposed. High levels of either are undesirable, with the level of photoinitiator generally limited to 5% or less of contained photoinitiator. Faster cure speeds are preferred with cure speeds to a dry surface of generally less than 10 s desired. Cure speed to a surface that does not mar when rubbed can take longer but is generally preferred to be less than 2 minutes (min). Generally, the cure speed for curing the curable composition to a non-marrable finish for photoinitiator levels of 5% or less and energy levels of 250 mJ or less may be between 2 s to about 120 seconds. In various embodiments, the cure speed for the curing the curable composition composition to a non-marrable finish for photoinitiator levels of 5% or less and energy levels of 250 mJ may be between 2 s and 120 s, between 2 seconds to about 60 s, and between about 2 s to about 30 s.

(V) Properties of Cured Epoxy Resin Composition

Another aspect of the present disclosure provides a cured, epoxy resin composition. The UV cured product (i.e., the cross-linked product made from the curable composition) of the present invention shows several improved properties over conventional UV epoxy cured resins. For example, the cured product of the present invention may advantageously have increased pigment content, increased corrosion resistance, water resistance, and greater adhesion to the article. In a specific application of inkjet ink formulations, when the inkjet ink formulation is cured as the ink is disposed on the surface of a substrate such as a paper product, the cured product has the following properties such as dry to touch, smear resistance, adhesion, and vibrant color.

The composition of the present invention may be used to provide manufacturing coatings, such as inks, and in particular UV inks; and paints.

The curable composition of the present invention may be used to manufacture a cured thermoset product such as coatings in UV cure applications, adhesives, and marine repair. In another embodiment, the composition may be used to manufacture 3-dimensional objects for rapid prototyping. In one preferred embodiment, the curable composition can be used to prepare UV cure formulations for inks and coatings.

The inkjet ink formulations of the present invention exhibit a combination of properties that deliver a unique readily processable formulation in ink applications.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The "glass transition temperature" is the temperature at which a polymer transitions from a hard, glassy material to a soft, rubbery material.

The term "acyl," as used herein alone or as part of another group, denotes the moiety formed by removal of the hydroxyl group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes saturated hydrocarbyl groups that contain from 1 to 30 carbon atoms. They may be linear, branched, or cyclic, may be substituted as defined below, and include methyl, ethyl, propyl, isopropyl, butyl, hexyl, heptyl, octyl, nonyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The term "aryl" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl. Preferably, the aryl group can be phenyl or naphthol and more preferable, phenyl. The term "aromatic" encompasses "aryl" groups defined below. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. They may be straight, branched, or cyclic. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxyl, keto, ketal, phospho, nitro, and thio.

The term "neat" herein means that the composition is essentially free of any added solvent.

The term "solvent" means a liquid which dissolves the organic components of the composition but is inert to the organic components, i.e., the solvent does not react upon curing the composition.

The term "heat stable" or "heat stability" herein, with reference to a composition, means having a low change in viscosity. For example, a composition is heat stable when the initial viscosity of the composition does not change by more than 5 mPa-s over a period of 14 days at a temperature of 60° C.

The term "change in viscosity" herein, with reference to a composition, means the difference in the viscosity of the composition measured at 25° C. between the initial viscosity of the composition before heat ageing and the resulting viscosity of the composition after heat ageing.

The term "short term" herein means a period of time from about 24 hours to about 72 hours.

The term "long term" herein means a period of time of at least about 105 hours or at least about 170 hours.

Having described the invention in detail, it will be apparent that modifications and variations are possible without departing from the scope of the invention defined in the appended claims.

EXAMPLES

The following examples and comparative examples further illustrate the present invention in detail but are not to be construed to limit the scope thereof. Various terms and designations used in the following examples are explained herein as follows:

"DVBDO 95%" stands for divinylbenzene dioxide 95%.

"TEGDVE" stands for triethylene glycol divinyl ether; and is a product that is commercially available from BASF.

"BDDVE" stands for butanediol divinyl ether, and is a product that is commercially available from BASF.

"DEA" stands for 9,10-diethoxyanthracene and is a photosensitizer that is commercially available from Kawasaki Kasei.

"Cyclo" stands for 3,4-epoxycyclohexylmethyl-3,4-epoxycyclohexanecarboxylate, a cycloaliphatic epoxy, and is commercially available from Synasia as Synasia 06E resin, from Daicel as Celloxide 2021P, or previously from The Dow Chemical Company as UVR 6105 and ERL 4221.

Irgacure 290 is a triarylsulfonium tetrakis(pentafluorophenyl)borate photoinitiator commercially available from BASF.

CPI 6992 is a mixture of bis[4-(diphenylsulfonio)phenyl] sulfide bis(hexafluorophosphate) and diphenyl[(phenylthio) phenyl]-sulfonium hexafluorophosphate, a mixed triarylsulfonium hexafluorophosphate photoinitiator in propylene carbonate commercially available from Aceto Corporation.

Esacure 1187 is a bridged triarylsulfonium hexafluorophosphate photoinitiator commercially available from Lamberti.

Omnicat 650 is a bridged triarylsulfonium hexafluorophosphate commercially available from IGM Resins.

Sulfonium triflate is a mixture of bis[4-(diphenylsulfonio) phenyl]sulfide bis(trifluoromethylsulfonate) and diphenyl [(phenylthio)phenyl]-sulfonium trifluoromethylsulfonate commercially available from Aldrich Chemical.

Double cure 1190 and 1176 are mixed triarylsulfonium photoinitiators with, respectively the hexafluorophosphate and hexafluoroantimonate anions commercially available from Double Bond Chemical.

Irgacure 270 is a triarylsulfonium hexafluorophosphate photoinitiator commercially available from BASF.

Ningbo CPI is a mixture of bis[4-(diphenylsulfonio)phenyl]sulfide bis(hexafluoroantimonate) and diphenyl[(phenylthio)phenyl]-sulfonium hexafluoroantimonate; and is commercially available from Ningbo Chemical.

CPI 210S is diphenyl[(phenylthio)phenyl]-sulfonium tris (pentafluoroethyl)-trifluorophosphate, a triarylsulfonium trifluoro-tris(pentafluoroethyl)phosphate photoinitiator, and CPI 100P which is diphenyl[(phenylthio)phenyl]-sulfonium hexafluorophosphate a triarylsulfonium hexafluorophosphate photoinitiator, both commercially available from San Apro.

BYK 378 is a surfactant commercially available from BYK.

Each one of the following pigments, commercially available from RJA, is delivered as a 25% dispersion in a carrier, either vinyl ether such as TEGDVE ("carrier-TEGDVE"), or as a blend of vinyl ether and cycloaliphatic epoxy resin:

1. Cyan: Pigment Blue 15:4: Copper phthalocyanine ("PB15:4").
2. Cyan: Pigment Blue 15:3: Copper phthalocyanine ("PB15:3").
3. Magenta: Pigment Red 122: Dimethylquinacridone ("PR122").
4. Magenta: Pigment Violet 19: Quinacridone ("PV19")

The following standard analytical equipments and methods are used in obtaining the experimental values for viscosity and surface tension.

Measurement of Viscosity

The viscosity of the formulation was measured on a stress control rheometer TA Instruments AR2000 equipped with a 60 millimeter (mm) diameter flat stainless steel upper plate and a bottom Peltier plate assembly controlling both the temperature of the liquid sample and the normal force acting on the surface of the Peltier plate. About 0.5 milliliter (mL) of the formulation was deposited on the bottom plate before the top plate was lowered onto the liquid formulation until a gap of 100 microns (p) between the two plates was achieved. The top plate was then rotated at a shear rate of 10 s−1 while the temperature of the bottom plate was maintained at 25° C. Viscosity was automatically calculated using software by TA Instruments and reported in millipascals seconds (mPa-s).

General Ink Preparation Procedure

Ink compositions were prepared by weighing a dry photoinitiator into DVBDO or other epoxy. After the photoinitiator dissolved in the DVBDO, vinyl ethers and cycloaliphatic epoxy were added to the solution of photoinitiator and DVBDO; and the solution was mixed by shaking. A pigment dispersion was then added to the resulting mixture; and the mixture was made homogeneous by either shaking or rolling for several minutes. When and if the photoinitiator was supplied as a liquid in a carrier such as propylene carbonate, the photoinitiator/carrier was added to the above mixture after the other components but before the pigment dispersion. When, and if, a photosensitizer was used, the dry photosensitizer was weighed in first and dissolved in vinyl ether. The inks were then filtered through a 1 t glass fiber filter and stored in opaque containers. In the following tables the components of each ink formulation are expressed as their wt %.

Ink Thermal Stability

Ink compositions were stored at 60° C. and their viscosity at 25° C. was measured periodically after 24-72 hours (hr), herein referred to as "short term", and thereafter periodically for at least 100 hr and up to 483 hr, herein referred to as "long term". The thermal stability of the ink is measured by the change in viscosity after the short and/or the long term tests versus the initial viscosity and by the percentage increase in the viscosity between the short and/or the long term tests versus the initial viscosity. Both lower viscosity change and lower % viscosity change represent a better thermal stability of the ink.

Examples 1-6: Thermally Stable Cyan Inks Having <30 mPa-s at 25° C.

Examples 1-6 described in Table IV were prepared using the "General Ink Preparation Procedure" as described above and using a phthalocyanine type cyan pigment PB15:4 and a triarylsulfonium tetrakis(pentafluorophenyl)borate photoinitiator Irgacure 290.

TABLE IV

Thermally Stable Cyan Inks Having <30 mPa-s at 25° C.

| | Example | | | | | |
|---|---|---|---|---|---|---|
| | 1 | 2 | 3 | 4 | 5 | 6 |
| DVBDO 95% BDDVE | 20.3% | 20.1% | 19.9% | 20.0% | 19.9% 9.1% | 20.0% 16.0% |
| TEGDVE | 15.9% | 17.0% | 18.1% | 21.0% | 9.3% | |
| Cyclo | 34.8% | 33.7% | 32.9% | 27.9% | 30.8% | 32.9% |
| Cyan D4010PB15:4 | 5.0% | 5.1% | 5.0% | 5.0% | 5.0% | 5.0% |
| TEGDVE vehicle | 15.0% | 15.2% | 15.0% | 15.0% | 15.0% | 15.0% |
| 1% BYK 378 in BDDVE | 4.1% | 4.0% | 4.0% | 4.0% | 4.0% | 4.1% |
| Irgacure 290 | 5.0% | 5.0% | 5.0% | 5.1% | 5.0% | 5.0% |
| DEA | | | | 2.0% | 2.0% | 2.0% |
| Total | 100.0% | 100.0% | 100.0% | 100.0% | 100.0% | 100.0% |
| Initial viscosity | 28.8 | 26.9 | 25.9 | 21.4 | 18.9 | 18 |
| Viscosity ~24 hr | 29.8 | 28 | 26.6 | 27.7 | 24.6 | 24.5 |
| Viscosity Change 24 hr | 1 | 1.1 | 0.7 | 6.3 | 5.7 | 6.5 |
| % Change 24 hr | 3.5% | 4.1% | 2.7% | 29.4% | 30.2% | 36.1% |
| Total Test Hours | 178 | 178 | 178 | 328 | 328 | 328 |
| Final Viscosity | 29.6 | 28.3 | 27 | 25.5 | 24.3 | 22.7 |
| Viscosity Change | 0.8 | 1.4 | 1.1 | 4.1 | 5.4 | 4.7 |
| % Change Final | 2.8% | 5.2% | 4.2% | 19.2% | 28.6% | 26.1% |

Examples 1-6 demonstrate cyan ink formulations having an initial viscosity of <30 mPa-s at 25° C.; having a short term thermal stability of <40%; and having a long term stability of <30%.

Comparative Examples A and B—Thermally Unstable Cyan Inks Having <30 mPa-s at 25° C.

Comparative Examples A and B described in Table V were prepared as described above in Examples 1-6 using a phthalocyanine type cyan pigment PB15:4 and a triarylsulfonium hexafluorophosphate photoinitiator CPI 6992.

TABLE V

Thermally Unstable Cyan Inks Having <30 mPa-s at 25° C.

| Comparative Example | A | B |
|---|---|---|
| DVBDO 95% | 19.9% | 19.9% |
| BDDVE | 17.0% | 0.0% |
| TEGDVE | | 15.9% |
| Cyclo | 29.9% | 29.9% |
| Cyan D4010PB15:4 | 5.0% | 5.0% |

TABLE V-continued

Thermally Unstable Cyan Inks Having <30 mPa-s at 25° C.

| Comparative Example | A | B |
|---|---|---|
| TEGDVE vehicle | 15.0% | 15.0% |
| 1% BYK 378 in BDDVE | 3.0% | 4.0% |
| CPI 6992 | 5.1% | 5.1% |
| Propylene Carbonate | 5.1% | 5.1% |
| Total | 100.0% | 100.0% |
| Initial viscosity | 13.8 | 22.6 |
| Viscosity ~24 hr | 57 | 133.2 |
| Viscosity change 24 hr | 43.2 | 110.6 |
| % Change 24 hr | 313% | 489% |
| Total Test Hours | 315 | 170 |
| Final Viscosity | 36.5 | 31.5 |
| Viscosity Change | 22.7 | 8.9 |
| % Change Final | 165% | 139% |

The formulations of Comparative Examples A and B show that such formulations similar to the formulations of Examples 1-6 have an initial viscosity of <30 mPa-s at 25° C. When a different photoinitiator is used, the formulations have a short term thermal stability of >130%.

Examples 7-14: Thermally Stable Cyan Inks Having <10 mPa-s at 25° C.

Examples 7-14 described in Table VI were prepared as described above in Examples 1-6 using a phthalocyanine type cyan pigment PB15:4 and either a triarylsulfonium tetrakis(pentafluorophenyl)borate photoinitiator Irgacure 290 or a triarylsulfonium trifluorotris(pentafluoroethyl) phosphate photoinitiator CPI 210S.

TABLE VI

Thermally Stable Cyan Inks Having <10 mPa-s at 25° C.

| | Example | | | | | | | |
|---|---|---|---|---|---|---|---|---|
| | 7 | 8 | 9 | 10 | 11 | 12 | 13 | 14 |
| DVBDO 95% | 20.0% | 20.0% | 20.0% | 20.0% | 23.0% | 24.8% | 20.0% | 20.1% |
| BDDVE | 34.9% | 39.9% | 42.7% | 44.9% | 39.9% | 39.7% | 44.0% | 42.9% |
| Cyclo | 17.9% | 13.0% | 10.0% | 8.2% | 10.1% | 8.0% | 11.0% | 9.9% |
| Cyan 4010PB15:4 | 5.0% | 5.1% | 5.1% | 5.0% | 5.0% | 5.1% | 5.0% | 5.0% |
| TEGDVE vehicle | 15.1% | 15.2% | 15.2% | 15.0% | 14.9% | 15.4% | 15.0% | 0% |
| Cyclo vehicle | | | | | | | | 7.5% |
| BDDVE Vehicle | | | | | | | | 7.5% |
| Irgacure 290 | 5.0% | 5.0% | 5.0% | 5.0% | 5.0% | 5.0% | | 5.0% |
| CPI 210S | | | | | | | 5.0% | |
| DEA | 2.0% | 2.0% | 2.0% | 2.0% | 2.0% | 2.0% | | 2.0% |
| Total | 100.0% | 100.0% | 100.0% | 100.0% | 100.0% | 100.0% | 100.0% | 100.0% |
| Initial viscosity | 8.7 | 6.8 | 5.9 | 5.1 | 6.1 | 6.1 | 4.9 | 6.8 |
| Viscosity ~24 hr | 13 | 10.7 | 9 | 8.2 | 9.5 | 9.3 | 5.1 | 7.0 |
| Viscosity change 24 hr | 4.3 | 3.9 | 3.1 | 3.1 | 3.4 | 3.2 | 0.2 | 0.2 |
| % change 24 hr | 49% | 57% | 53% | 61% | 56% | 52% | 4% | 3% |
| Total Test Hours | 414 | 414 | 482.5 | 482.5 | 482.5 | 482.5 | 336 | 353 |
| Final Viscosity | 12.5 | 10.8 | 8.3 | 8.4 | 8.8 | 8.8 | 5.3 | 7.0 |
| Change | 3.8 | 4 | 2.4 | 3.3 | 2.7 | 2.7 | 0.4 | 0.2 |
| % Change Final | 43.7% | 58.8% | 40.7% | 64.7% | 44.3% | 44.3% | 8.2% | 3% |

Examples 7-14 demonstrate cyan ink formulations having an initial viscosity <10 mPa-s at 25° C. and having a short term thermal stability of <70% change in viscosity and a long term thermal stability of <70% change in viscosity. For instance, Example 14 shows greatly improved stability as compared to the use of hexafluorphosphate or hexafluoroantimonate.

Comparative Examples C-G—Thermally Unstable Cyan Inks Targeted for <10 mPa-s at 25° C.

Comparative Examples C-G described in Table VII were prepared as described above in Examples 1-6 using a phthalocyanine type cyan pigment PB15:4 and either a triarylsulfonium hexafluorophosphate photoinitiator such as CPI 6992 or CPI100P, or a bridged triarylsulfonium hexafluorophosphate photoinitiator such as Esacure 1187 or Omnicat 650, or a triarylsulfonium triflate.

TABLE VII

Thermally Unstable Cyan Inks Targeted for <10 mPa-s at 25° C.

| Comparative Example | C | D | E | F | G |
|---|---|---|---|---|---|
| DVBDO 95% | 20.0% | 20.0% | 20.7% | 20.0% | 20.1% |
| BDDVE | 37.0% | 35.9% | 35.2% | 36.0% | 39.5% |
| Cyclo | 13.0% | 18.0% | 18.0% | 14.0% | 15.1% |
| Cyan D4010PB15:4 | 5.0% | 5.0% | 5.0% | | 5.1% |
| Cyan D4010PB15:3 | | | | 5.0% | |
| TEGDVE vehicle | 15.0% | 15.0% | 15.0% | 15.0% | 15.2% |
| CPI 6992 | | | | 5.00% | |
| CPI 100P | 5.0% | | | | |
| Esacure 1187 | | 3.0% | | | |
| Omnicat 650 | | | 5.90% | | |
| Sulfonium Triflate | | | | | 5.0% |
| Propylene Carbonate | 5.0% | 3.00% | | 5.00% | |
| Total | 100.0% | 100.00% | 100% | 100% | 100.0% |
| Initial viscosity | 6.2 | 141 | 163 | 269 | 69 |
| Viscosity ~60 hr | 11.8 | | | | |
| Viscosity Change ~60 hr | 5.6 | | | | |
| % Change ~60 hr | 90 | | | | |
| Total Test Hours | 336 | | | | |
| Final Viscosity | 12.6 | | | | |
| Change | 6.4 | | | | |
| % Change Final | 103% | | | | |

Comparative Example C shows a formulation similar to those of Examples 1-6 having an initial viscosity <10 mPa-s at 25° C. except that the formulation of Comparative Example C uses a different photoinitiator; and has a short term thermal stability of 90% and a long term thermal stability of >100%. Comparative Examples D-G show formulations similar to those of Examples 1-6 except that the Comparative Examples D-G use different photoinitiators; and do not have an initial viscosity <10 mPa-s at 25° C. In Example D the concentration of photoinitiator was limited to 3 wt % because of the photoinitiator's limited solubility.

Examples 15-17—Thermally Stable Magenta Inks Having <30 mPa-s at 25° C.

Examples 15-17 described in Table VIII were prepared as described above in Examples 1-6 using quinacridone type magenta pigments PR122 and PV19 and a triarylsulfonium tetrakis(pentafluorophenyl)borate photoinitiator Irgacure 290.

TABLE VIII

Thermally Stable Magenta Inks Having <30 mPa-s at 25° C.

| Example | 15 | 16 | 17 |
|---|---|---|---|
| DVBDO 95% | 21.1% | 20.0% | 20.0% |
| BDDVE | 17.9% | | |
| TEGDVE | | 20.0% | 16.8% |
| Cyclo | 31.6% | 28.9% | 34.9% |
| Magenta D4010R122 | 5.3% | | 5.0% |
| Magenta D4010V19 | | 5.0% | |
| TEGDVE vehicle | 15.8% | 15.0% | 15.0% |
| 1% BYK 378 in BDDVE | 3.2% | | |
| 1% BYK 378 in TEGDVE | | 4.0% | 4.3% |
| Irgacure 290 | 5.1% | 5.0% | 4.0% |
| DEA | | 2.0% | |
| Total | 100.0% | 100.0% | 100.0% |
| Initial viscosity | 14.5 | 19.6 | 23.3 |
| Viscosity ~24 hr | 14.1 | 20.8 | 22.6 |
| Total Test Hours | 315 | 328 | 375 |
| Final Viscosity | 15.3 | 19.7 | 23.7 |
| Viscosity Change | 0.8 | 0.1 | 1.4 |
| % Change Final | 5.5% | 0.5% | 6.0% |

Examples 15-17 describe magenta ink formulations that have an initial viscosity of <30 mPa-s at 25° C.; and that have a long term stability of <10%.

Comparative Examples H-L—Thermally Unstable Magenta Inks Having <30 mPa-s at 25° C.

Comparative Examples H-L described in Table IX were prepared as described above in Examples 1-6 using a quinacridone type magenta pigment PR122 and either a triarylsulfonium hexafluorophosphate photoinitiator as CPI 6992, Esacure 1187, Double Cure 1190, Double Cure 1176, Irgacure 270, or Ningbo triarylsulfonium hexafluoroantimonate.

TABLE IX

Thermally Unstable Magenta Inks Having <30 mPa-s at 25° C.

| Comparative Example | H | I | J | K | L |
|---|---|---|---|---|---|
| DVBDO 95% | 19.9% | 19.9% | 20.0% | 20.7% | 20.00% |
| BDDVE | 16.9% | 16.9% | 17.0% | 17.6% | |
| TEGDVE | | | | | 16.90% |

TABLE IX-continued

Thermally Unstable Magenta Inks Having <30 mPa-s at 25° C.

| Comparative Example | H | I | J | K | L |
|---|---|---|---|---|---|
| Cyclo | 29.9% | 29.9% | 30.0% | 31.1% | 29.10% |
| Magenta D4010R122 | 5.0% | 5.0% | 5.0% | 5.2% | 5.00% |
| TEGDVE vehicle | 14.9% | 14.9% | 15.0% | 15.5% | 15.00% |
| 1% BYK 378 in BDDVE | 3.1% | 3.1% | 3.0% | 3.2% | |
| 1% BYK 378 in TEGDVE | | | | | 4.10% |
| CPI 6992 | 5.2% | | | | 5.00% |
| Esacure 1187 | | | | | |
| Double Cure 1190 | | 5.2% | | | |
| Double Cure 1176 | | | 5.0% | | |
| Irgacure 270 | | | | | |
| Ningbo sulf. SbF$_6$ | | | | 6.6% | |
| Propylene Carbonate | 5.2% | 5.2% | 5.0% | | 5.00% |
| | | | | | |
| Total | 100.0% | 100.0% | 100.0% | 100.0% | 100.00% |
| Initial viscosity | 12.9 | 13.4 | 14.9 | 16.7 | 21 |
| Total Test Hours | 315 | 115 | 115 | 115 | 375 |
| Final Viscosity | 54 | 40.6 | 44.4 | 57 | 47 |
| Change | 41.1 | 19.35 | 29.5 | 40.3 | 26 |
| % Change | 319% | 144% | 198% | 241% | 124% |

Comparative Examples H-L show that formulations similar to those of Examples 15-17 having an initial viscosity of <30 mPa-s at 25° C. but using different photoinitiators have a long term thermal stability of >120%.

Examples 18-21—Thermally Stable Magenta Inks Having <10 mPa-s at 25° C.

Examples 18-21 described in Table X were prepared as described above in Examples 1-6 using quinacridone type magenta pigments PR122 and PV19 and either a triarylsulfonium tetrakis(pentafluorophenyl)borate photoinitiator Irgacure 290, or a triarylsulfonium trifluoro-tris(pentafluoroethyl)phosphate photoinitiator CPI 210S.

Examples 18-21 describe magenta ink formulations that have an initial viscosity <10 mPa-s at 25° C.; and that have a short term thermal stability of <10% and a long term stability of <10%.

Comparative Examples M-Q—Thermally Unstable Magenta Inks Targeted for <10 mPa-s at 25° C.

Comparative Examples H-L described in Table XI were prepared as described above in Examples 1-6 using a quinacridone type magenta pigment PR122 or PV19 and either a triarylsulfonium hexafluorophosphate photoinitiator such as CPI 6992, Esacure 1187, or CPI 100P.

TABLE X

Thermally Stable Magenta Inks Having <10 mPa-s at 25° C.

| Example | 18 | 19 | 20 | 21 |
|---|---|---|---|---|
| DVBDO 95% | 20.0% | 20.0% | 20.00% | 19.90% |
| BDDVE | 39.9% | 36.0% | 40.00% | 31.80% |
| TEGDVE | | | | |
| Cyclo | 13.0% | 20.0% | 10.00% | 20.00% |
| Magenta D4010R122 | | 5.0% | | 5.00% |
| Magenta D4010V19 | 5.0% | | 5.00% | |
| TEGDVE vehicle | 15.1% | 15.0% | 15.00% | 14.90% |
| 1% BYK 378 in BDDVE | | | | 4.00% |
| Irgacure 290 | 5.0% | 4.0% | | 4.30% |
| CPI 210S | | | 5.00% | |
| DEA | 2.0% | | | |
| | | | | |
| Total | 100.0% | 100.0% | 100.00% | 100.00% |
| Initial viscosity | 6.1 | 7.3 | 5.3 | 7.2 |
| Viscosity ~70 hr | 6 | 7.4 | 5.7 | 7.6 |
| Viscosity change 70 hr | −0.1 | 0.1 | 0.4 | 0.4 |
| % change 70 hr | −1.6% | 1.4% | 7.5% | 5.6% |
| Total Test Hours | 345 | 393 | 336 | 319 |
| Final Viscosity | 6.2 | 7.9 | 5.1 | 8.4 |
| Change | 0.1 | 0.6 | −0.2 | −0.5 |
| % Change Final | 1.6% | 8.2% | −3.8% | −6.9% |

TABLE XI

Thermally Unstable Magenta Inks Targeted for <10 mPa-s at 25° C.

| Comparative Example | M | N | O | P | Q |
|---|---|---|---|---|---|
| DVBDO 95% | 20.0% | 19.90% | 20.0% | 20.1% | 20.7% |
| BDDVE | 36.0% | 35.80% | 35.6% | 35.8% | 35.2% |
| TEGDVE | | | | | |
| Cyclo | 14.0% | 14.00% | 13.9% | 18.1% | 18.2% |
| Magenta D4010R122 | | | 5.0% | 5.0% | 5% |
| Magenta D4010V19 | 5.0% | 5.00% | | | |
| TEGDVE vehicle | 15.0% | 15.10% | 15.0% | 15.1% | 15.1% |
| CPI 6992 | 5.0% | 5.00% | 5.3% | | |
| Escure 1187 | | | | 3.0% | |
| Omnicat 650 | | | | | 5.9% |
| Propylene Carbonate | 5.0% | 5% | 5.3% | 3.0% | |
| Total | 100.0% | 100.00% | 100.0% | 100.0% | 100.0% |
| Initial viscosity | 6.1 | 6.5 | 6.3 | 354 | 13.2 |
| Viscosity ~70 hr | 12 | 12.6 | 25 | | |
| Viscosity change 70 hr | 5.9 | 6.1 | 18.7 | | |
| % change at 70 hr | 97% | 94% | 297% | | |
| Total Test Hours | 365 | 440 | 278 | | |
| Final Viscosity | 10.7 | 11.7 | 25 | | |
| Change | 4.6 | 5.2 | 18.7 | | |
| % Change Final | 75% | 80% | 298% | | |

Comparative Examples M-O describe formulations similar to those of Examples 18-21 having an initial viscosity <10 mPa-s at 25° C.; except that the formulations use a different photoinitiator and have a short term thermal stability of >90% and a long term thermal stability >75%. Comparative Examples P and Q describe formulations similar to those of Examples 18-22 except that the formulations use different photoinitiators; and do not have an initial viscosity <10 mPa-s at 25° C.

What is claimed is:

1. A heat stable radiation curable epoxy resin composition for preparing an ink composition comprising:
   (a) at least one divinylarene dioxide compound;
   (b) at least one photoinitiator compound;
   (c) at least one pigment; and
   (d) at least one photosensitizer;
wherein the at least one photoinitiator compound is a triarylsulfonium salt having the following structure:

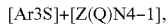

[Ar3S]+[Z(Q)N4−1], wherein [Ar3S]+ is a triarylsulfonium cation; [Z(Q)N+1] is a non-oxidizing, weakly coordinating anion; Z is a Group 3a, Group 4a, or Group 5a atom; Q is fluorine (F), an organofluorine radical, or mixtures thereof; N is the atomic number of element Z; and Q group bonded directly to Z is less than or equal to (N+1)/2 for group 5a;
wherein the at least one pigment is (i) a cyan pigment, or (ii) a magenta pigment;
wherein the viscosity, prior to ageing, of the heat stable curable epoxy resin composition is less than about 50 mPa-s at 25° C.;
wherein the short term change in viscosity measured at 25° C. of the cyan ink after ageing at 60° C. from about 24 hours to about 72 hours is less than about 80 percent and wherein the long term change in viscosity measured at 25° C. of the cyan ink after ageing at 60° C. for at least about 170 hours is less than about 90 percent; and
wherein the short term change in viscosity measured at 25° C. of the magenta ink after ageing at 60° C. from about 24 hours to about 72 hours is less than about 50 percent and wherein the long term change in viscosity measured at 25° C. of the magenta ink after ageing at 60° C. for at least about 105 hours is less than about 50 percent.

2. The curable epoxy resin composition of claim 1, wherein the viscosity of the heat stable curable epoxy resin composition is from about 2 mPa-s to less than about 50 mPa-s measured at 25° C.;
wherein the short term change in viscosity measured at 25° C. of the cyan ink after ageing at 60° C. from about 24 hours to about 72 hours is less than about 70 percent and wherein the long term change in viscosity measured at 25° C. of the cyan ink after ageing at 60° C. for at least about 170 hours is less than about 70 percent; and
wherein the short term change in viscosity measured at 25° C. of the magenta ink after ageing at 60° C. from 24 hours to 72 hours is less than about 10 percent and wherein the long term change in viscosity measured at 25° C. of the magenta ink after ageing at 60° C. for at least about 105 hours is less than about 10 percent.

3. The curable epoxy resin composition of claim 1, wherein the viscosity of the curable composition measured at 25° C. is from about 2 mPa-s to about 25 mPa-s.

4. The curable epoxy resin composition according to claim 1, wherein the viscosity of the curable composition measured at 25° C. is from about 4 mPa-s to about 10 mPa-s.

5. The curable epoxy resin composition according to claim 1, wherein the at least one divinylarene dioxide compound is selected from a group comprising substituted divinylbenzene dioxide, divinylnaphthalene dioxide, divinylbiphenyl dioxide, divinyldiphenylether dioxide, and combinations thereof.

6. The curable epoxy resin composition according to claim 5, wherein the at least one divinylarene dioxide compound is divinylbenzene dioxide resin.

7. The curable epoxy resin composition of claim 1, wherein the at least one pigment compound is selected from the group consisting of cyan, magenta pigments, and combinations thereof.

8. The curable epoxy resin composition according to claim 1, wherein the at least one pigment compound is selected from the group consisting of PB15:4, PR122, PV19 and mixtures thereof; and wherein the at least one photoinitiator compound is a sulfonium tetrakis (perfluorophenyl) borate.

9. The curable composition according to any claim 1, wherein the composition comprises at least one vinyl ether compound.

10. The curable epoxy resin composition according to claim 1, wherein the at least one vinyl ether compound is selected from a group comprising a mono vinyl ether, a divinyl ether, a trivinyl ether, or combinations thereof.

11. The curable composition according to claim 1, wherein the vinyl ether is butanediol divinyl ether, diethylene glycol divinyl ether, triethylene glycol divinyl ether; or mixtures thereof.

12. The curable composition according to claim 1, wherein the composition comprises at least one epoxide compound, other than the divinylarene dioxide.

13. The curable composition according to claim 1, wherein the at least one photosensitizer is selected from a group comprising substituted and unsubstituted polynuclear aromatic compounds, substituted and unsubstituted aromatic, heterocyclic compounds, and combinations thereof.

14. The curable composition according to claim 1, wherein the at least one photosensitizer is dibutoxyanthracene, dipropoxyanthracene, diethoxyanthracene, hydroxymethylanthracene, dimethoxyanthracene, or mixtures thereof.

15. A process for preparing a heat stable UV curable epoxy resin composition for preparing an ink composition comprising admixing:
  a. at least one divinylarene dioxide compound;
  b. at least on photoinitiator compound;
  c. at least one pigment; and
  d. at least one photosensitizer;
wherein the at least one photoinitiator compound is a triarylsulfonium salt having the following structure:

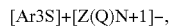

[Ar3S]+[Z(Q)N+1]−, wherein [Ar3S]+ is a triarylsulfonium cation; [Z(Q)N+1] is a non-oxidizing, weakly coordinating anion; Z is a Group 3a, Group 4a, or Group 5a atom; Q is fluorine (F), an organofluorine radical, or mixtures thereof; N is the atomic number of element Z; and the Q groups bonded directly to Z is less than or equal to (N+1)/2 for Group 5a;

wherein the at least one pigment is (i) a cyan pigment based on a phthalocyanine compound, or (ii) a magenta pigment based on a cyclic organic compound bearing amino N—H groups;

wherein the viscosity, prior to ageing, of the heat stable curable epoxy resin composition is less than about 50 mPa·s at 25° C.;

wherein the short term change in viscosity measured at 25° C. of the cyan ink after ageing at 60° C. from about 24 hours to about 72 hours is less than about 80 percent and wherein the long term change in viscosity measured at 25° C. of the cyan ink after ageing at 60° C. for at least about 170 hours is less than about 90 percent; and wherein the short term change in viscosity measured at 25° C. of the magenta ink after ageing at 60° C. from about 24 hours to about 72 hours is less than about 50 percent and wherein the long term change in viscosity measured at 25° C. of the magenta ink after ageing at 60° C. for at least about 105 hours is less than about 50 percent.

16. The process of claim 15, wherein the composition further comprises a filler, a reactive diluent, a flexibilizing agent, a processing aide, a toughening agent, or mixtures thereof.

17. The process of claim 15, wherein the components are mixed between 0° C. to 50° C.

18. A cured product prepared by curing the curable epoxy resin composition of claim 1.

* * * * *